(12) United States Patent
Odashima et al.

(10) Patent No.: US 9,289,050 B2
(45) Date of Patent: Mar. 22, 2016

(54) FASTENING TOOL

(75) Inventors: Kiyoshi Odashima, Miyazaki (JP); Yasuhisa Seo, Miyazaki (JP)

(73) Assignee: Clipware Corporation (JP)

( * ) Notice: Subject to any disclaimer, the term of this patent is extended or adjusted under 35 U.S.C. 154(b) by 1457 days.

(21) Appl. No.: 12/598,486

(22) PCT Filed: Mar. 28, 2008

(86) PCT No.: PCT/JP2008/056195
§ 371 (c)(1),
(2), (4) Date: Jan. 19, 2010

(87) PCT Pub. No.: WO2008/139783
PCT Pub. Date: Nov. 20, 2008

(65) Prior Publication Data
US 2010/0212121 A1   Aug. 26, 2010

(30) Foreign Application Priority Data
May 1, 2007   (JP) .................................. 2007-120748

(51) Int. Cl.
*A45F 5/02* (2006.01)
*A44B 11/26* (2006.01)

(52) U.S. Cl.
CPC .................. *A45F 5/02* (2013.01); *A44B 11/266* (2013.01); *A45F 2200/055* (2013.01); *A45F 2200/0508* (2013.01); *Y10T 24/44* (2015.01); *Y10T 24/44966* (2015.01); *Y10T 24/45037* (2015.01)

(58) Field of Classification Search
CPC ......... A44B 1/14; A44B 11/266; A44B 1/123; A44B 99/00; A45F 5/02; A45F 2200/055; A45F 2200/0508; E04D 4/143; A47C 21/022; Y10T 24/44; Y10T 24/44966; Y10T 24/45037; Y10T 24/45042; Y10T 24/367

USPC ........... 24/114.12, 72.5, 113 R, 113 MP, 459, 24/136 R, 3.12, 11 S, 59, 457, DIG. 31, 24/DIG. 35, DIG. 51, 578.1, 581.1, 580.11, 24/480, 590.1; 40/315, 1.5, 662; 224/194; 248/316.7, 316.4, 229.12, 229.22, 248/228.3, 230.3, 231.4; 2/265, 336
See application file for complete search history.

(56) References Cited

U.S. PATENT DOCUMENTS 502,201 A * 7/1893 Pilbeam ................... 24/113 MP
535,377 A * 3/1895 Jackson .......................... 24/467
(Continued)

FOREIGN PATENT DOCUMENTS

JP     5-9306 U      2/1993
JP     11000207      1/1999
(Continued)

OTHER PUBLICATIONS

International Search Report for International (PCT) Application No. PCT/JP2008/056195, mailed Aug. 19, 2008, 4 pages.
(Continued)

*Primary Examiner* — Abigail Morrell
(74) *Attorney, Agent, or Firm* — Sheridan Ross P.C.

(57) ABSTRACT

Provided is a fastener, which has advantages over the prior art in that a retaining force is not dependent upon the biasing force of a spring, the fastener hardly comes out, and is less restricted in size than the prior art. The fastener has another important advantage over the prior art in that it forms no hole in plain cloth. A fitting portion (2) and a base portion (3) are assembled to have a clamping unit (1) opened. A stopper (4) is pushed together with the plain cloth into the inside of the clamping unit (1). This clamping unit (1) is closed to hold the plain cloth between the outer circumference of the stopper (4) and the leading ends of holding means (26 and 36). With slide portions (22) being fully fitted in groove portions (32), retaining pawls (23) are fitted in pawl receivers (33b).

2 Claims, 24 Drawing Sheets

(56) References Cited

U.S. PATENT DOCUMENTS 4,221,028 A * 9/1980 Fischer .................. 24/457
5,060,356 A   10/1991 Szedzinski
5,901,417 A *  5/1999 Alexiou ................. 24/90.5

FOREIGN PATENT DOCUMENTS

| JP | 2005-095228 | 4/2005 |
| JP | 2006-230728 | 9/2006 |

OTHER PUBLICATIONS

Translation of Written Opinion of the International Searching Authority for International (PCT) Application No. PCT/JP2008/056195.

International Preliminary Report on Patentability for International (PCT) Application No. PCT/JP2008/056195, mailed Nov. 24, 2009.

* cited by examiner (a)

(b)

FASTENING TOOL

FIELD OF INVENTION

This invention is a fastener which is fastened on sheets, such as cloth. It is fastened on the sheet without making a hole, or using a bottom on the sheets.

BACKGROUND OF INVENTION

When something is fastened on sheets, such as a clothing material, the needle of a safety pin or a pin is typically stuck into the material. This needle must damage the material, even if it is a small amount of damage. For example, if a name plate is fastened with a safety pin on the same position of the clothing everyday, the pin hole will become bigger very quickly. In the case of a delicate material, such as silk, even if it is not repeatedly stuck, when just one sticking needle might make a very tiny hole, it spoils the worth of clothing.

In order to solve this problem, the present inventors disclosed "fastening tools" in the following 2 inventions.
JP.A2006-230728
JP.U2007-2484

These inventions provide fastening tools which fasten nameplates or on clothes without sticking needles. These fasteners have utility because they achieve "easy fit and less drop-out" which was not achieved by the badge type prior art. Also, these tools do not press on clothes hard and therefore prevent damage to the materials.

However, the holding performance of these tools depends on the resiliency of the springs. Therefore, when the force against resiliency of the spring is set, the fastening tool may drop out. If the spring was stronger to prevent drop-out, not only would the advantage "easy fit" be lost, but a fear that the tool presses on the material too strongly might appear.

A certain size of the fastening tool is required to obtain a length for the spring's expansion and then this length makes sufficient fastening performance. Therefore the minimum sizing of a tool is limited. The shape of the tool has to be slender so a spring could expand and contract therein. The prior arts, such as a safety pin, are applied in many fields because these prior arts can be made in very small sizes. Compared with the prior arts, the abovementioned fastening tools have too many size limitations.

SUBJECT MATTER OF THE PRESENT INVENTION

The subject of the present invention is to provide a fastener that has fastening performances that are independent of a spring's resiliency, that does not easily drop out, that is smaller than the prior fastening tools, and that the important subject "no pin hole on clothes" is achieved.

To achieve the subject of the present invention, a fastener comprises a clamping unit which expands and contracts, a stopper which is clamped by said clamping unit, and retaining means so that said clamping unit does not become wider than a clamped width when said clamping unit is contracted and held by said stopper.

Further, in the present invention, said clamping unit has more than two holding means, said clamping unit is positioned on one side of the sheet material, said clamping unit clamps said stopper, which is positioned the other side of sheet material, with said holding means, and a gap between said holding means and said stopper is bigger than the thickness of said sheet material while clamped.

Further, in the present invention, said stopper is button shaped and fits on one side of sheet material, said clamping unit has more than two holding means, said holding means are positioned at the same side as said stopper, and said holding means holds said stopper.

Further, in the present invention, said clamping unit does not become wider than a clamped width while the clamping unit is locked, and has means to release clamping of said clamping unit intentionally.

Further, in the present invention, said means to release comprise moving means to move a portion of said clamping unit to a release position, and resiliency means to flick out said clamping unit toward a release direction when said portion of clamping unit is in a release position.

Further, a fastener of the present invention comprises a clamping unit which expands and contracts, a stopper which is clamped by said clamping unit, said clamping unit has more than two holding means, said holding means holds said stopper when said clamping unit is contracted, retaining means so that said clamping unit does not become wider than a clamped width thereof, and said clamping unit clamps said stopper through sheet material, or said clamping unit clamps said stopper which is installed as a button.

EFFECT OF THE INVENTION

For example, a clamping unit is made of a flexible resin. A pawl portion and the other portion are formed with the flexible resin as clamping means, and these means are capable of retaining and releasing means are capable of retaining and releasing. The sufficient holding is secured, since the clamping unit does not become wider than a clamped width when the clamping unit is contracted and holds the stopper. Therefore, the fastener does not drop off and it does not need spring like the prior art. Consequently, since the space for a spring is not necessary, the size limitation is removed; the fastener of the present invention can be applied to products of many sizes and/or many materials, and its usage is broadened.

Further, when the clamping unit of this invention clamps sheet material with said stopper and more than two holding means, a gap between the holding means and the stopper is bigger than the thickness of the sheet material. Therefore, stress on the materials is minimized. Even if the holding area, which is where the holding means holds the stopper, is small, the fastener does not lose holding performance because of its structure. Moreover, the amount of material caught is minimized and its wrinkles, which is a big unsolved problem of the prior fastening tools, are dramatically minimized.

Furthermore, a stopper is a button installed on a sheet material and a clamping unit is positioned at the same position. Even with very thick clothes, which are not proper to be clamped by the clamping unit, the clamping unit can clamp easily on an existing button or a newly provided button. The fastener can be used in winter and throughout the year, and then a problem, such as not being able to use a fastener in winter is solved. The fastener can be used in many applications, such as armbands and mobile phone straps, not just name plates; thus, the potential applications where the fastener may be used are broadened. When it is used for clamping sheet material and stopper together, another button can be easily substituted because of its shape, even if the original stopper is lost.

An intentional releasing means of clamping unit is provided and it easily releases the clamping unit. The structure of the clamping unit is designed to have anti drop off means such that the clamping unit is not released unintentionally; however, its operation ability is developed by this releasing means.

Further, the present invention additionally provides resiliency means to flick out the clamping unit toward a release direction as another means to release the clamping unit. Upon this resiliency means acts, the clamping unit is easily released by itself. The fasteners retaining and releasing is much easier than the prior art fasteners.

Further, the present invention provides two optional means, which include: means for the clamping unit to clamp a sheet material and a stopper together and means for the clamping unit to hold a stopper installed as a button on clothes, and either one or both means can be selected. Whereby it is optionally used depending on the thickness of material or purpose, and thus its applications are broadened.

FIG. 13 is a perspective view of the fastener involved in the second embodiment which is assembled and fitted on.

NUMBERS

1 ... clamping unit, 2 ... fitting portion, 3 ... base portion, 22 ... slide portion, 32 ... groove portion, 23 ... retaining pawl, 33a ... pawl receiver, 33b ... pawl receiver, 4 ... stopper.

BEST MODE OF THE PRESENT INVENTION

A fastener of the present invention is made of resin material which has flexibility by injection molding. For example, resins, such as POM (polyoxymethylene), PA (polyamide), or ABS resin (acrylonitrile butadiene styrene) may be suitable.

Figure 1:
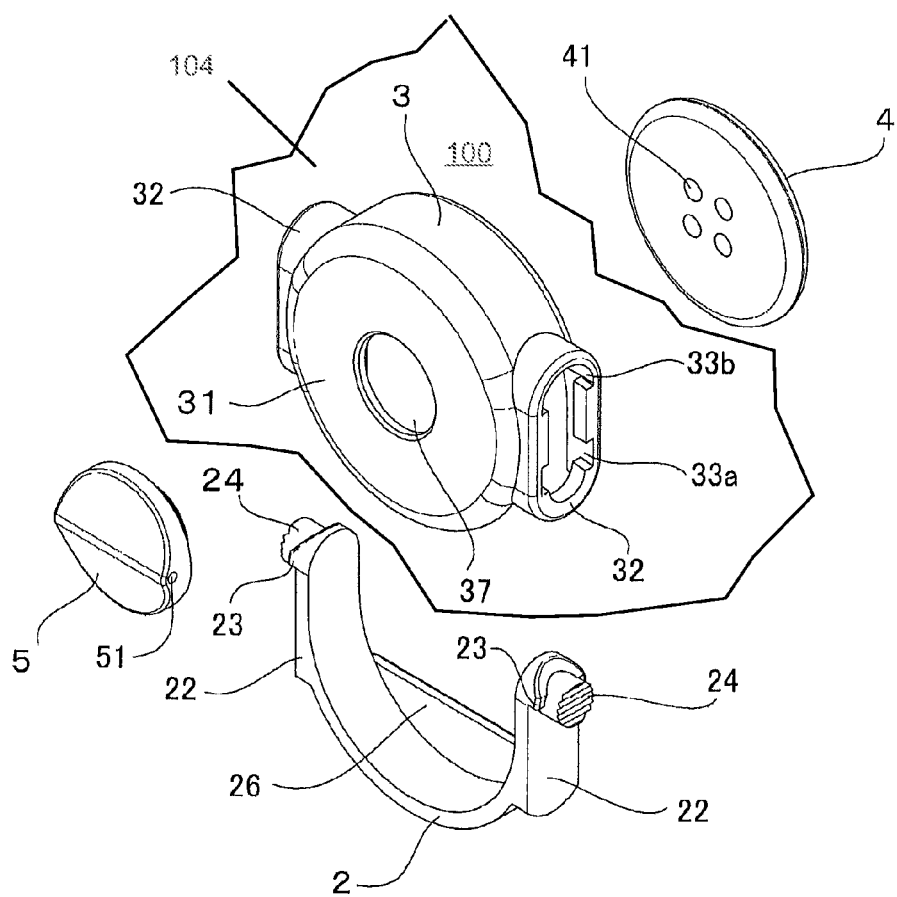
FIG. 1 is disassembled perspective view of a fastener involved in the first embodiment of the present invention, shown from the front side.
Figure 2:
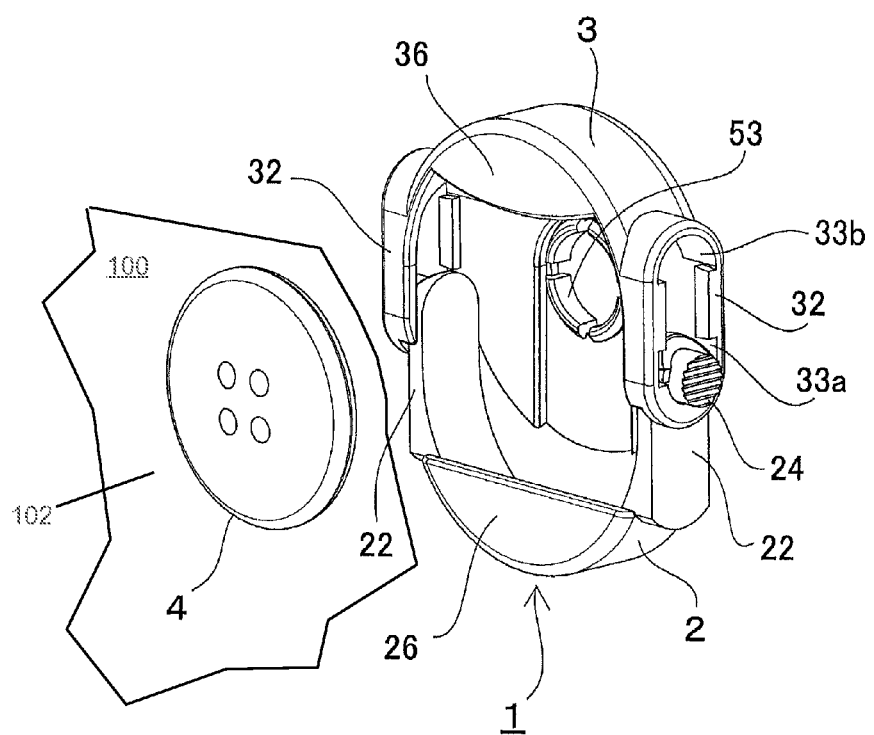
FIG. 2 is a perspective view of the fastener involved in the first embodiment which is assembled before fitting and shown from the rear side.
Figure 3:
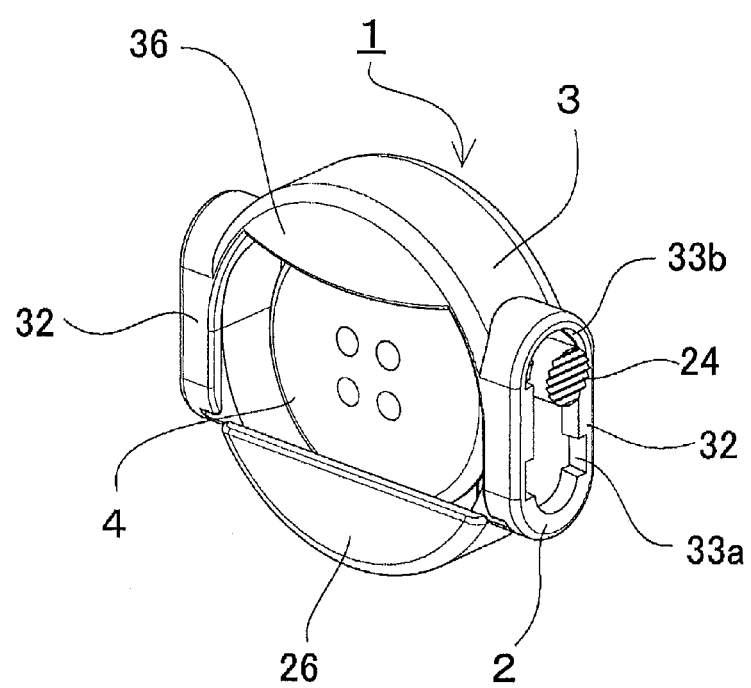
FIG. 3 is a perspective view of the fastener involved in the first embodiment which is fitted on without showing the sheet material.

The first embodiment of a fastener is hereby described. As shown in FIGS. 1 to 3, the fastener consists of a clamping unit 1 and a stopper 4 which is positioned at the opposite side of the clothing. A rotating portion 5 which is freely rotatable is installed on the clamping unit 1. The clamping unit 1 consists of a fitting portion 2 and a base portion 3. These two portions are fitted together and make the main part of the clamping unit 1.

The base portion 3 consists of a round front portion 31 and groove portions 32 on both sides of the front portion 31. The fitting portion 2 is in the shape of the letter "U", and slide portions 22 are composed at both sides thererof. These slide portions 22 slide along groove portions 32. The slide portions 22 have retaining pawls 23. The groove portions 32 have pawl receivers 33a and 33b which receive the retaining pawls 23. As mentioned later with regard to how to use the fastener, the pawl receivers 33a provide an open position of clamping unit 1, and the pawl receivers 33b provide a closed position of clamping unit 1.

Push buttons 24 are provided on the outer sides of each of the retaining pawls 23 in order to push the slide portions 22 into the inside. These push buttons 24 are also provided to release the retaining pawls 23 from the pawl receivers 33b. The push buttons 24 are thicker in depth than the retaining pawls 23 and are retained by the pawl receivers 33b.

Figure 4:
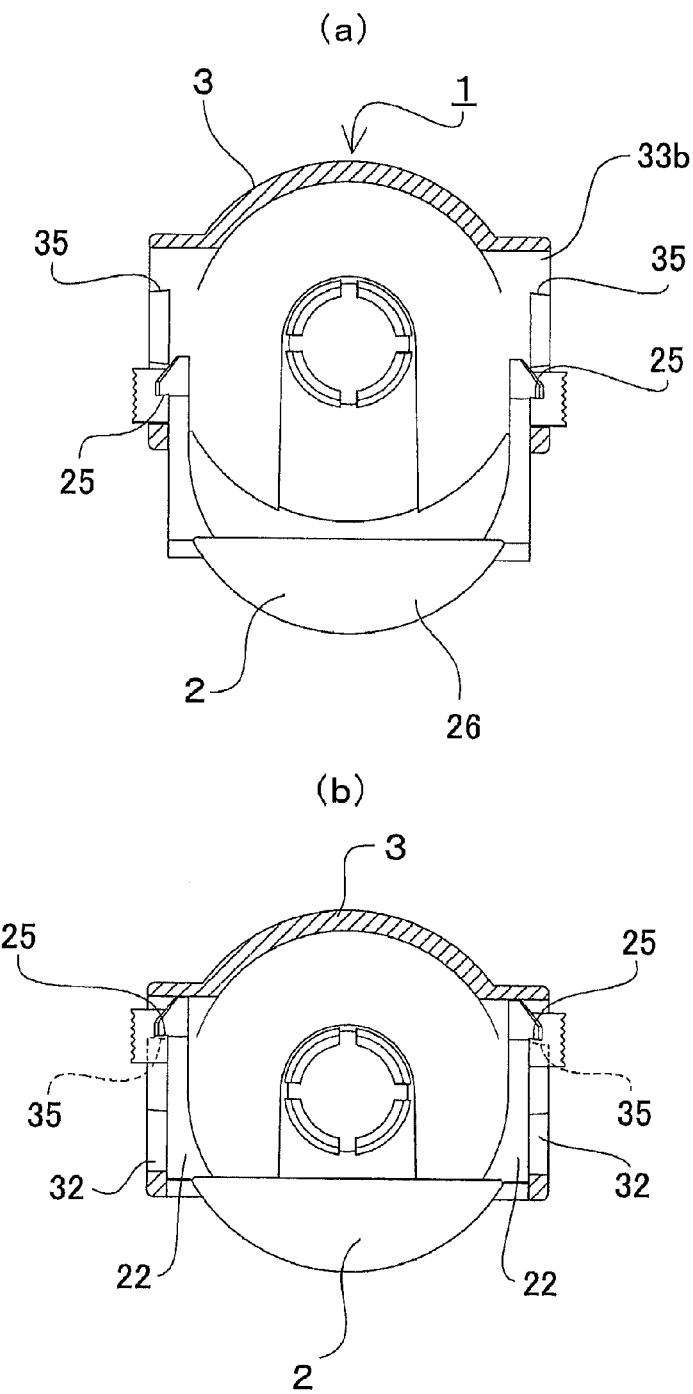
FIG. 4 is a partial section view of the fastener involved in the first embodiment, showing its operation.
Figure 5:
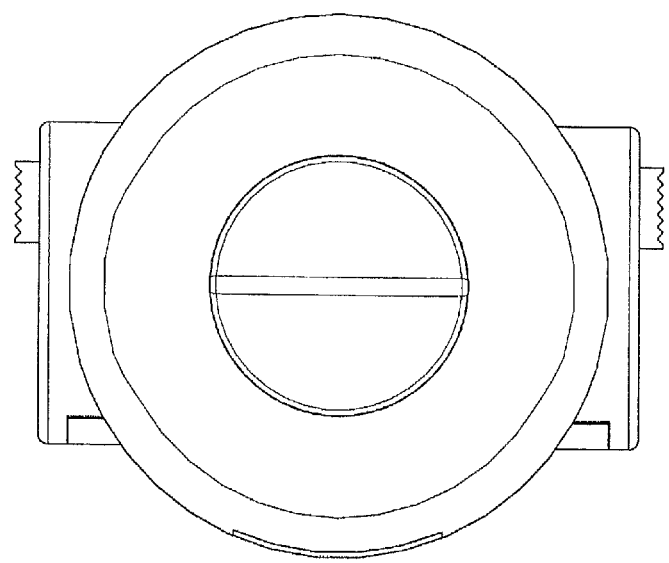
FIG. 5 is a front plan view of the fastener involved in the first embodiment.
Figure 6:
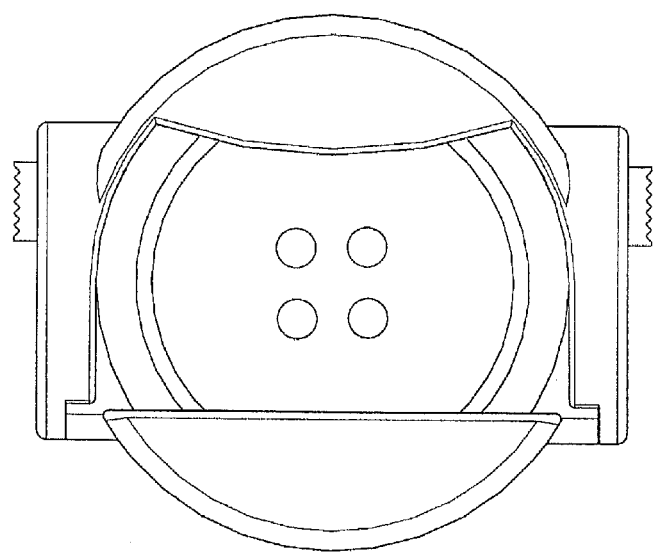
FIG. 6 is a rear plan view of the fastener involved in the first embodiment.
Figure 7:
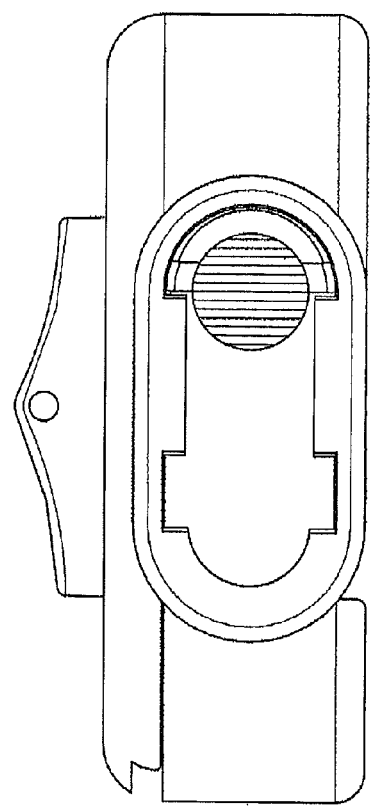
FIG. 7 is a right side plan view of the fastener involved in the first embodiment.
Figure 8:
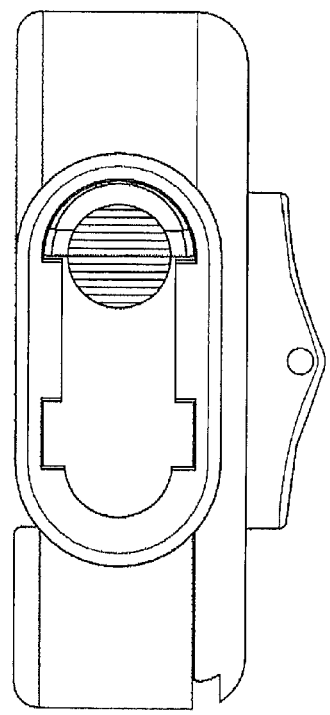
FIG. 8 is a left side plan view of the fastener involved in the first embodiment.
Figure 9:
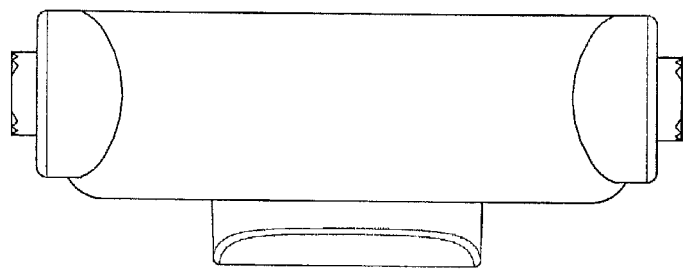
FIG. 9 is a upper side plan view of the fastener involved in the first embodiment.
Figure 10:
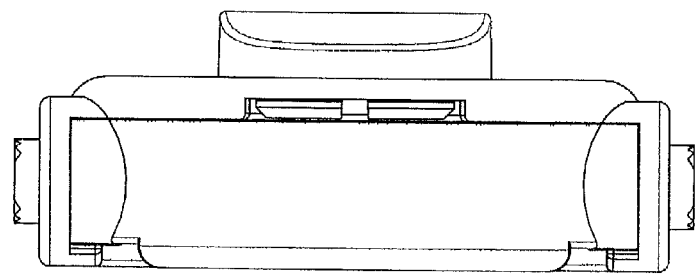
FIG. 10 is a bottom plan view of the fastener involved in the first embodiment.

The outsides of the retaining surfaces 25 of the retaining pawls 23 are formed slightly lower than the inside surfaces thereof. Also, the outsides of the receiving surfaces 35 of pawl receivers 33b are formed slightly lower than the inside surfaces thereof. (refer FIG. 4) The slopes of the retaining surfaces 25 and the receiving surfaces 35 are anti release structures and act against the pressure to separate the fitting portion 2 from the base portion 3, because the pressure moves the retaining pawls 23 deeper into the pawl receivers 33b.

To release the retaining pawls 23 from the pawl receivers 33b with the push buttons 24, the push buttons 24 have to be pushed over the slopes. The pawl receivers 33b have enough room so that the retaining pawls 23 can be pushed over.

The fitting portion 2 and the base portion 3 have respective holding means 26 and 36 in order to hold the stopper 4 thereto. The shape of the holding means is not necessarily specified as having a certain shape but either holding means are shaped as an arc in this embodiment. Whereby, the stress on the cloth between the stopper 4 and the holding means is minimized, and the stopper 4 and cloth are held properly by holding means.

The front portion 31 of the base portion 3 has an install hole 37 to install the rotating portion 5. The rotating pivots 53 of the rotating portion 5 are installed into the install hole 37. An insert hole 51 is provide to insert a safety pin or other pins.

The stopper 4 has thread holes 41 and then the stopper 4 can be sewed on a cloth. Therefore, even with thick clothes, such as winter wear, this fastener can be fitted on the outside of the clothes.

It is hereby described how to use this fastener. FIGS. 1 and 2 are exploded perspective views of an assembled fitting portion 2 and base portion 3. The fitting portion 2 and the base portion 3 are also shown assembled in FIG. 4(a). The clamping unit 1 forms an opening. Then the stopper 4 is positioned on one side of the clothes 100 (also referred to herein as "material"), such as the inside 102 of the clothes, and the clamping unit 1 is positioned on the other side of the clothes 100, which is the outside 104 of the clothes in this case.

Under the above condition, the stopper 4 and cloth are pushed into the clamping unit 1 together. After the stopper 4 and cloth are stored in the clamping unit 1, the fitting portion 2 and base portion 3 are pushed toward each other, then the clamping unit 1 is closed, and the distance between the edges of each holding means 26 and 36 become slightly smaller than diameter of the stopper 4. A gap between the periphery of stopper 4 and the edges of each holding means 26 36, which is bigger than a thickness of cloth, is created. Therefore, the cloth is not pinched actually, but the cloth is held by touching softly either the periphery of stopper 4 and the edges of each holding means 26 and 36.

As shown in FIG. 4(b), when the slide portion 22 is moved into the bottom of the groove portion 32, the retaining pawls 23 fit into the pawl receivers 22b. As mentioned above, after the retaining pawls 23 are received, it is not easy to release the fastener when the force to separate the fitting portion 2 and base portion 3 is set thereon. The retaining pawls 23 and pawl receivers 33b interact with each other strongly because of the slopes of the retaining surface 25 and the receiving surface 35.

To release the fastener, both push buttons 24 are pushed into the inside of the fastener, and then the retaining pawls 23 are released from the pawl receivers 33b. Since the cloth acts so as to separate the holding means 26 and 36 slightly, the retaining pawls 23 move against the pawl receivers 33a easily.

As described above, the advantages of the fastener of the present invention include the fastener being easy to fit and being sufficient to prevent unintended drop out after fitting. Since the amount of material, which is caught by the fastener, is less than in the case of the prior fastening tool, the stress onto the material is minimized and then wrinkles are reduced. On the other hand, when you intentionally release the fastener, it is easily released by pushing the push buttons 34.

The second embodiment of a fastener is hereby described. A fastener of this embodiment is developed from the above-mentioned clamping unit 1. It is configured as a name plate holder.

Figure 11:
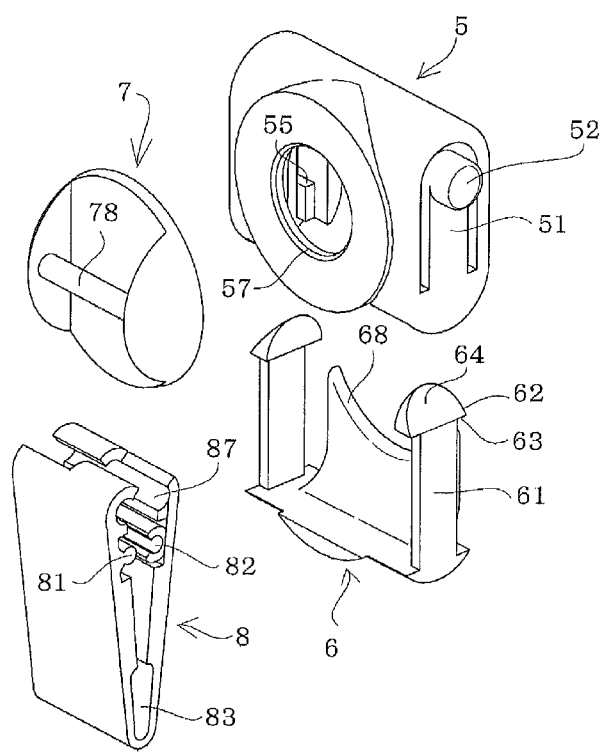
FIG. 11 is a disassembled perspective view of a fastener involved in the second embodiment of the present invention, shown from the front side.
Figure 12:
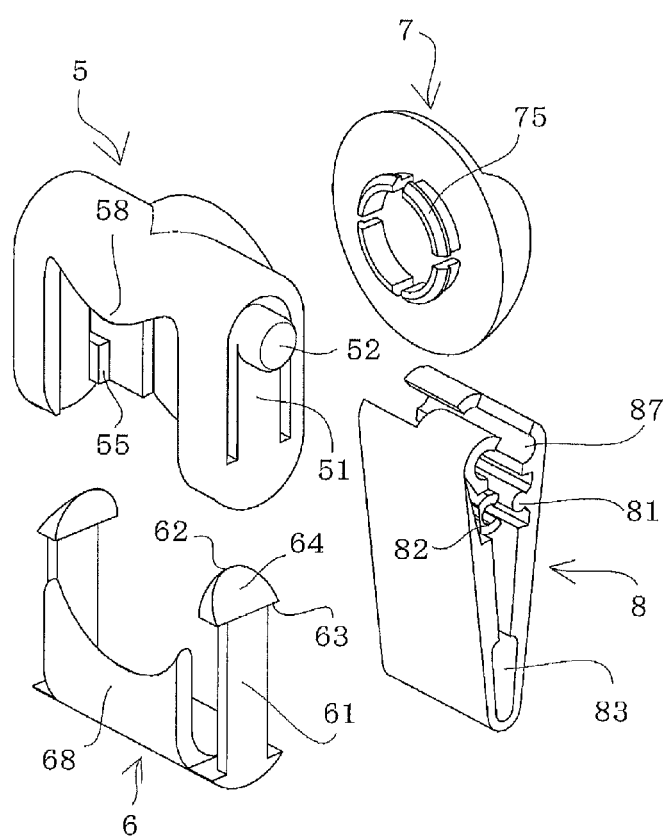
FIG. 12 is a perspective view of the fastener involved in the second embodiment, shown from the rear side.
Figure 13:
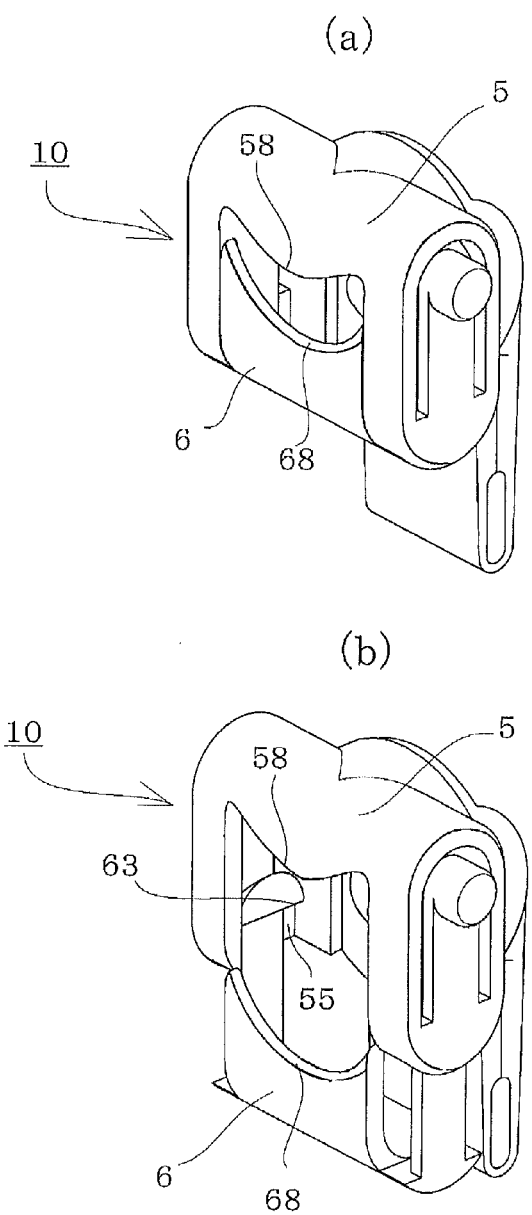

As shown in FIG. 11 and FIG. 12, the clamping unit 10 of this embodiment consists of a base portion 50 and a fitting portion 6 which fits into the base portion 50. A rotating portion 7 is rotatably installed on the base portion 50 and a hanging portion 8 which holds a name plate or other similar device and which is installed thereon. These portions are then assembled; the clamping unit 10 is shown in an opened position in FIG. 13(a), and the clamping unit 10 is shown in a closed position in FIG. 13(b).

Figure 14:
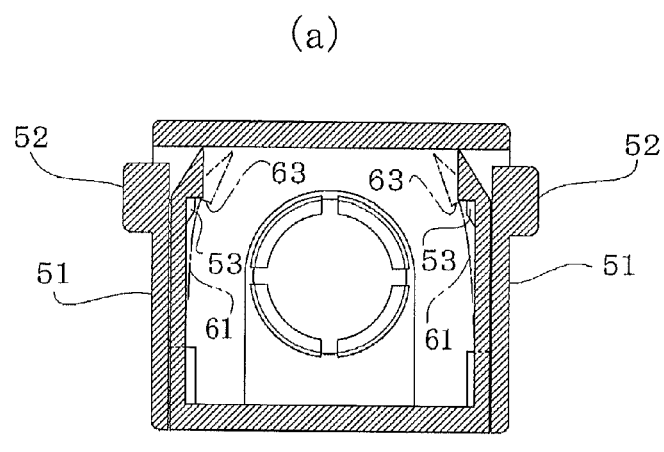
FIG. 14 is a section view of the fastener involved in the second embodiment showing its operation.
Figure 14:
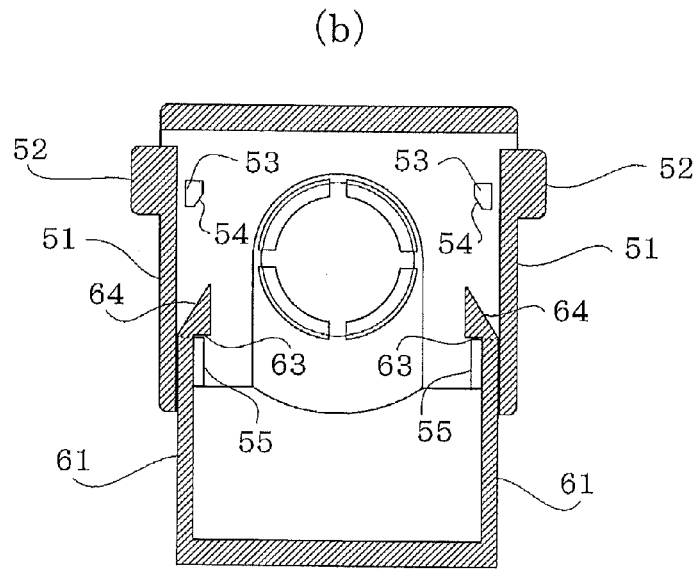
Figure 15:
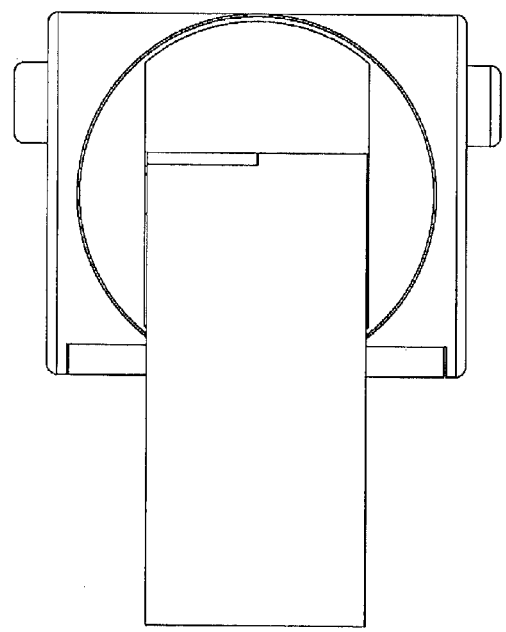
FIG. 15 is a front plan view of the fastener involved in the second embodiment.

The detail of the each portion is hereby described. As shown in FIG. 11 to FIG. 14, the push buttons 52 are on both sides of the base portion 50 and its lower portion has flexible button arms 59. As shown in FIG. 14(b), at both sides of its inside upper area, the upper pawl receivers 56 are respectively formed to receive the fitting portion 6, and at both sides of its inside lower area, the lower pawl receivers 55 are respectively formed to prevent the fitting portion 6 from dropping off. An install hole 57 is formed at the front surface of the base portion 50 to install the rotating portion 7. A holding means 58 is formed at the back surface, which is a protruding arc, to hold the clamping unit 10 on clothes.

At both sides of the fitting portion 6, flexible slide portions 61 are provided and these have respective pawl portions 62, which are half circle/wedge-shaped, at their tip. The outwardly protruding portion of each pawl portion 62 is the pawl 63, and it is received by the upper pawl receiver 56 of the base portion 50 to fit the clamping unit 10. A holding means 68 is provided at the back side of the base portion 50 to be fitted on clothes, and its tip is a concaved arc.

At the rear surface of the rotating portion 7, a rotating pivot 75, which is a circle that is divided into four parts, is formed to be installed in the install hole 57 of the base portion 50. A bar 78 is provided on the surface of the rotating portion 7 to install a hanging part 8.

The hanging part 8 is shaped as the letter "V". At its upper area, it has a ridge portion 81 and a grooved portion 82 to be fitted with each another when the hanging part 8 is closed. At its lower area, a holding tube 83, which has an elliptic section, is adapted to hold a name plate 85 (Refer FIG. 21). At its top portion, a fitting tube 87 is provided to be rotatably fitted on the bar 78 of the rotating portion 7.

The function of a clamping unit 10 is hereby described. The tip of the slide portions 61 of the fitting portion 6 is bent inwardly, and the pawls 63 can avoid lower pawl receivers 55. Then, the fitting portion 6 is inserted into the base portion 50. When the slide portions 61 are released after passing between both of the lower pawl receivers 55, they come back to their original shape. Thereby, the fitting portion 6 is not dropped off from the base portion because the pawls 63 are held by the lower pawl receivers 55, as shown in FIG. 14(b).

Furthermore, when the fitting portion 6 is pressed into the base portion 50, the slopes 64 of the pawl portions 62 contact the slopes 54 of the upper pawl receivers 56. Thereby, the slopes move along each other, and the upper portion on of the slide portion 61 is bent inwardly. The slide portions 61 regain their original shape after the bottom of the pawls 63 pass over the top of the upper pawl receiver 56. Whereby, the pawls 63 are received by the upper pawl receiver 56, and the clamping unit 10 is kept closed.

Regarding to the bottom surface of the pawls 63 and the top surface of the upper pawl receivers 56, the outside is respectively lower than the inside. When pressure to open the clamping unit 10 is set on, the outside surface of the slide portions 61 contacts the inside wall of the button arm 59, then it can hardly open, and the clamping unit 10 will not release easily.

Figure 16:
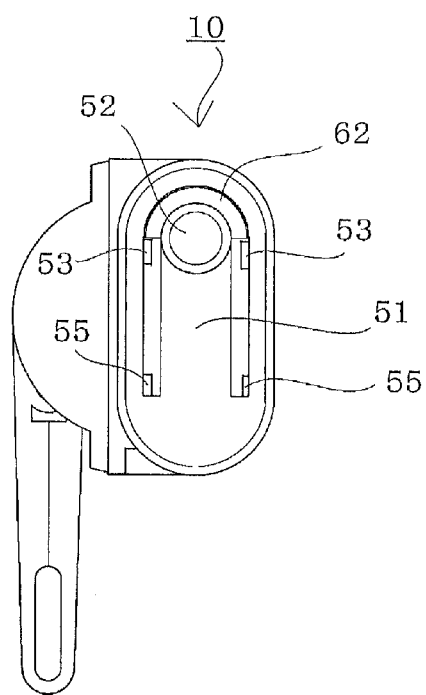
FIG. 16 is a right side plan view of the fastener involved in the second embodiment.
Figure 17:
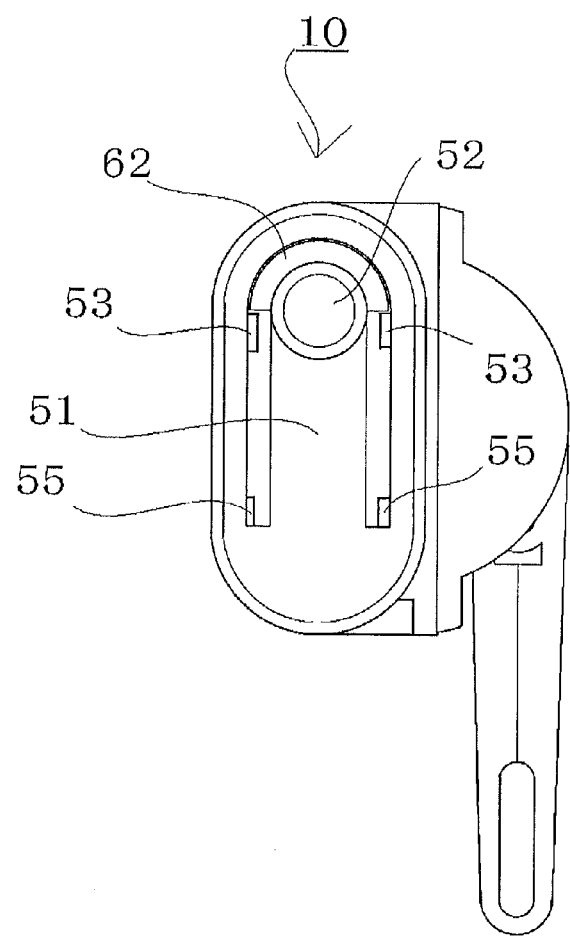
FIG. 17 is a left side plan view of the fastener involved in the second embodiment.
Figure 18:
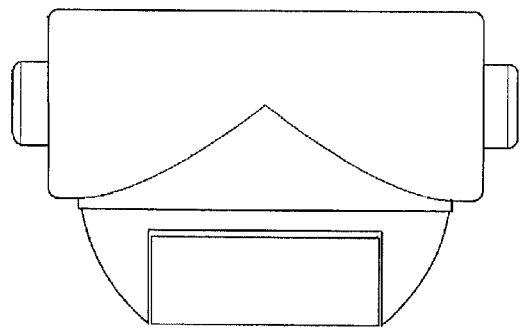
FIG. 18 is an upper side plan view of the fastener involved in the second embodiment.
Figure 19:
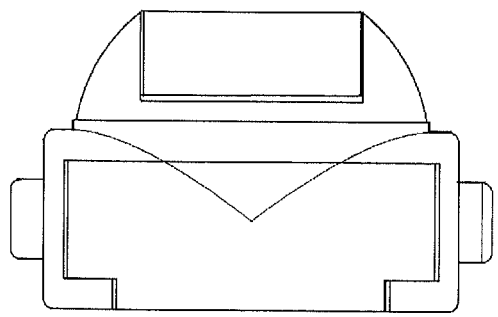
FIG. 19 is a bottom plan view of the fastener involved in the second embodiment.
Figure 20:
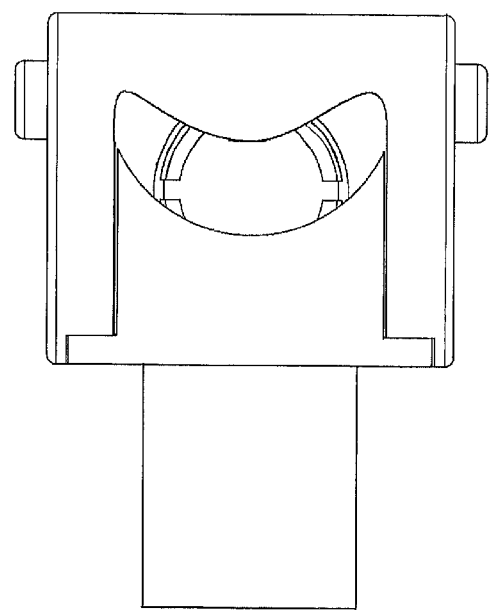
FIG. 20 is a rear plan view of the fastener involved in the second embodiment.

The push buttons 52 are pushed inwardly from both sides to release the clamping unit 10. As shown in FIGS. 16 and 17, since the width of the button arms 59 and the push buttons 52 are the same or less than the width of the slide portions, these push the pawl portions 62 together and the upper portion of the slide portions 62 are bent without obstacle by the upper pawl receivers 56. As shown in FIG. 14(a), when the bottom surfaces of pawls 63 are disengaged from the top surface of the upper pawl receivers 56, the slide portion 61 tends to slide down along the inner surface of the button arm 59 with its own resiliency, because the outer surface of the slide portion 61 and the inner surface of the button arm 59 are inwardly inclined. Therefore, the fitting portion 6 is forced to slide down. Instantly the clamping unit 10 is released. When the pawls 63 contact the lower pawl receivers 55, it does not slide down further, and the fitting portion 6 does not drop off from the base portion 50.

According to the above description, the clamping unit 10 can be reversibly handled, in open and closed positions, as shown in FIGS. 13(a) and (b). So the opening clamping unit 10 is put near a button (Not shown in the figure) of clothes and the clamping unit 10 is closed. The button is held by holding means 58 and holding means 68, and then the clamping unit 10 is easily kept on the clothes with thread of the button. When the clamping unit 10 is opened, it is easily taken off the clothes.

In the above description, the clamping unit 10 fits on a button of clothes. The usage is not restricted by the above description. For example, an ordinary button can be put inside of the clothes just like a stopper 4 of the first embodiment, and the material of clothes can be clamped between the button and the clamping unit 10. The holding means 58 of the base portion 50 is a protruding arc and the holding means 68 of the fitting portion 6 is a concave arc. Thus, a crescent hole is formed. The material can escape from both sides of this crescent hole.

Figure 21:
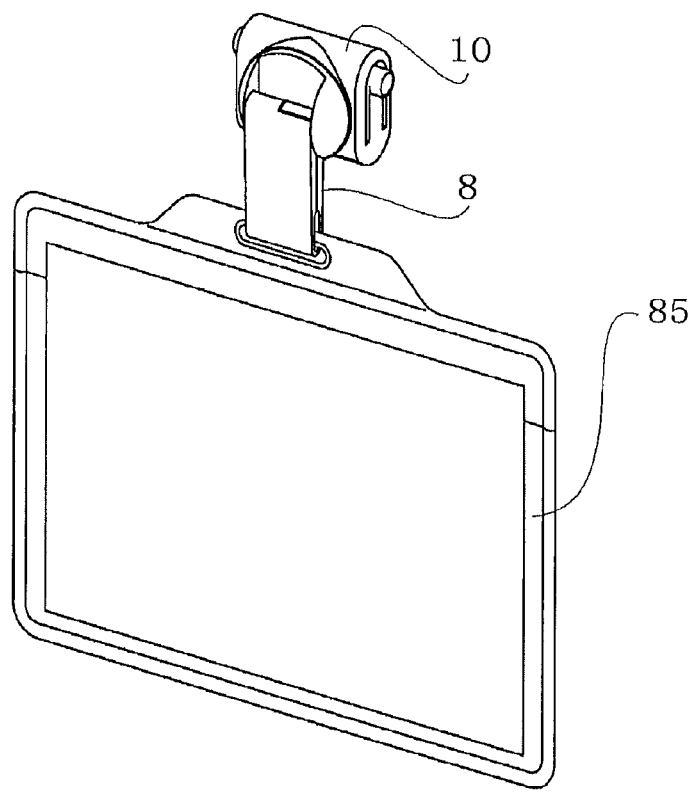
FIG. 21 is a perspective view of the fastener involved in the second embodiment, showing application for a name plate holder.
Figure 22:
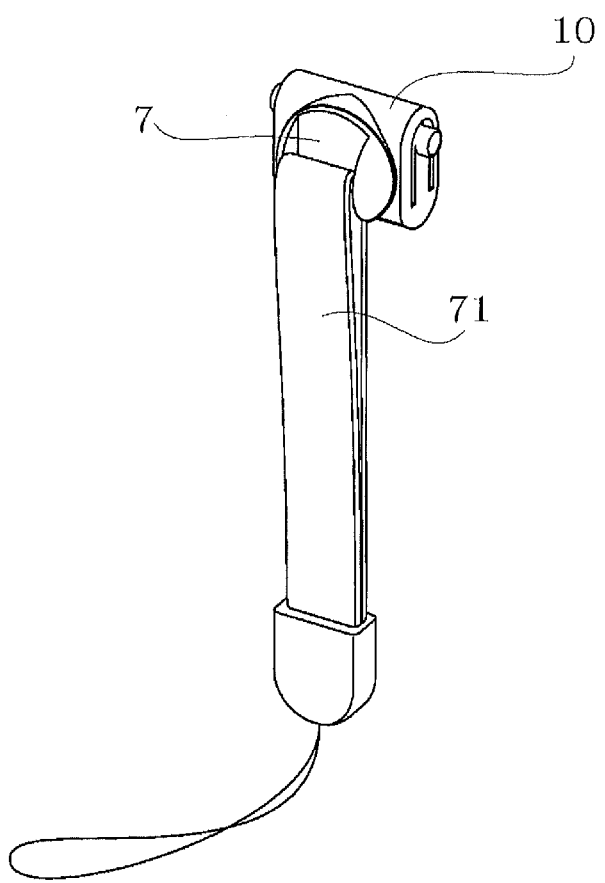
FIG. 22 is a perspective view of the fastener involved in the second embodiment, showing application for a strap of mobile phone.
Figure 23:
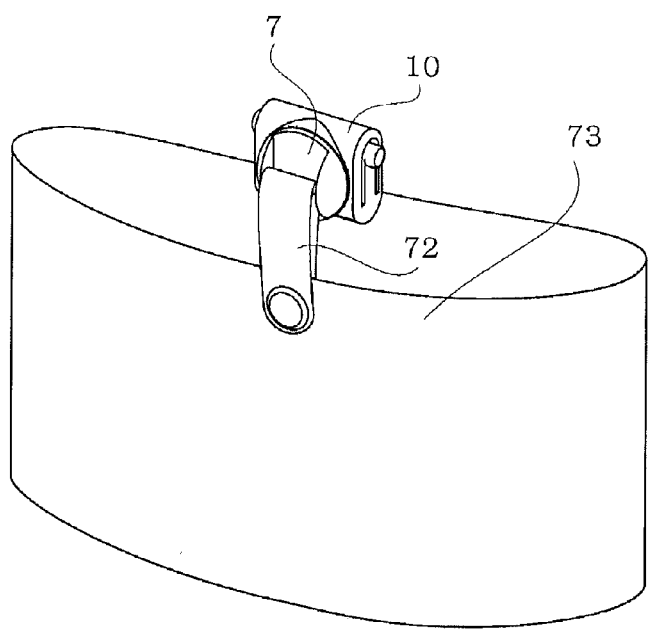
FIG. 23 is a perspective view of the fastener involved in the second embodiment, showing application for an arm band.

The clamping unit 10 of the second embodiment is applied to a holder of a name plate 85, as shown in FIG. 21. The name plate fits on a button which exists on clothes, fits on a button which is provided on clothes for this name plate, or fits by clamping with a button which is on the inside of clothes. While a name plate 85 is held on the holding tube 83, it can be reversed when the hanging portion 8 is turned 180 degrees with the rotating portion 7.

For another application of this fastener, a strap 71 for a mobile phone is installed on a bar 78 of the rotating portion 7. It is connected to a mobile phone (not shown), the mobile phone is put into a chest pocket, and the clamping unit 10 is fitted on a button of a shirt, thereby preventing its drop off. Therefore, accidentally dropping the mobile phone into water, which occurred when using prior clip types, is prevented, and the burden on the neck or shoulders from using a neck strap is solved.

Furthermore, a connecter 72 is installed on a bar 78 of the rotating portion 7 and is connected with an armband 73. The armband 73 is easily fitted on an arm when a button is provided on a sleeve. People who often have to wear armbands, such as workers at a construction site, guards, or press, suffered pin hole damages on their clothes from safety pins. Such suffering is solved instantly by the present invention.

Figure 24:
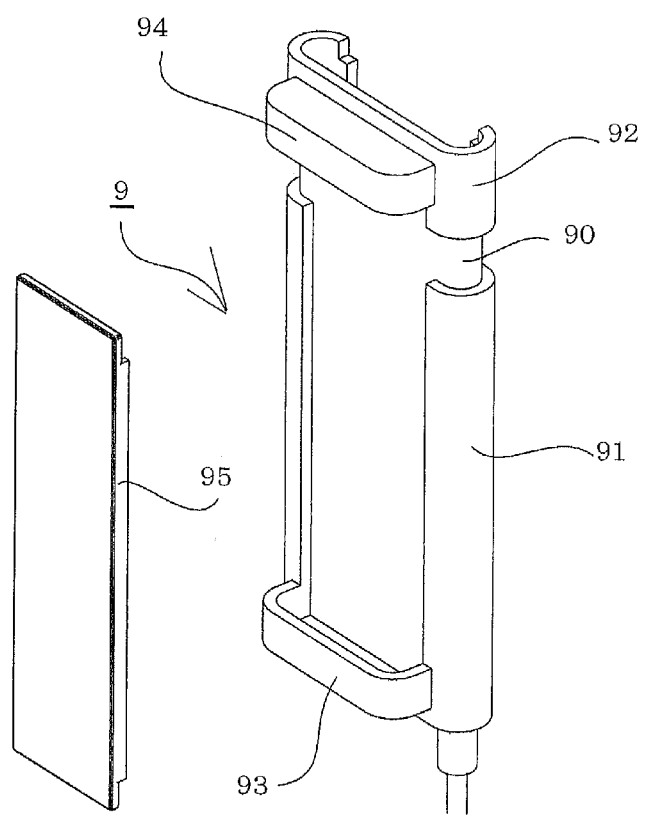
FIG. 24 is a perspective view of a ease for a MP3 mobile music device involved in the third embodiment, showing its structure.

The third embodiment is hereby described.
The above described structure can be applied for a fitting case of a MP3 mobile music device. For example, as shown in FIG. 24, a device 90 is stored in a case 9. The case 9 consists of a case body 91, lid 92, and stopper 95.

To use the case 9, the stopper 95 is positioned on the inside of the clothes, the case body 91 and the lid 92 storing the device 90 are positioned on the outside of the clothes. Both the top and bottom ends of the stopper 95 and the material of the clothes are held together by a lower holding means 93 and an upper holding means 94, and then it fits on any place of the clothes.

Prior arts devices used to fit MP3 mobile music devices on a body, use an exclusive arm holder to fit on an arm, or a clip type holder is fitted on the collar. However, the case 9 can be fitted on any part of the T-shirt, and a user is not annoyed. Therefore, a user can comfortably exercise, such as walking or jogging, while listening to music.

The present invention is not limited the above described embodiments. Any field of art, which substantially is in the scope of the claims of this invention and achieves the effects of this invention, is within the scope of the present invention.

The stopper 4 is shaped as a button in the above embodiment, but its shape is not so limited and any shape can be used. For example, a stopper can be ball and its clamping unit can be the same shape. Thereby, the stress on the material can be minimized and the size of the fastener can become small. Such structure may be made from precious metals and is possible to apply to and be used as jewelry.

As fastening means, a pawl which is made of flexible material is employed in the above embodiment. However, other methods, such as a hook type or screw may be used. Thereby, these can have many shapes and many usages.

APPLICATIONS

The fastener of the present invention is used to fasten a name plate without damaging clothing, instead of using a safety pin or other fasting tools. It is expected that the fastener will be used, not only for the name plates of students, but will also be widely used in the business fields and apparel markets. Further, it may develop to more kind of usages, such as a fastener of jewelry or a case of mobile music device.

What is claimed is:
1. A fastener, comprising:
a clamping unit having a first portion and a second portion, said first portion and said second portion selectively interconnected wherein said clamping unit expands and contracts, said first portion having a pawl receiver for selectively interconnected to a pawl of said second portion,
wherein said pawl is disposed on a slide portion of said second portion, said slide portion configured to be flexed inward with respect to said first portion to disengage said pawl from said pawl receiver and allow expansion of said clamping unit;
a stopper which is received by said clamping unit and selectively secured by said clamping unit when said clamping unit is contracted;
wherein said pawl and said pawl receiver prevent said second portion from expanding to a width greater than the width of the first portion when the clamping unit contracts to secure said stopper; and
wherein said clamping unit is positioned on one side of a material and wherein said stopper is positioned on an opposite side of the material such that said stopper and the material are positioned in the clamping unit when the clamping unit is contracted; and
wherein the clamping unit has at least two holding means and said holding means hold said stopper and said material; and
wherein a gap between said holding means and said stopper is adapted to be larger than a thickness of the material when the clamping unit is contracted.
2. The fastener of claim 1, further comprising a means to move the second portion of the clamping unit to a release position, wherein actuation of said means to move the second portion allows said fastener to expand.

* * * * *